Nov. 27, 1951  F. T. COURT  2,576,779
IMPLEMENT ATTACHMENT MEANS
Filed Feb. 12, 1945  2 SHEETS—SHEET 1
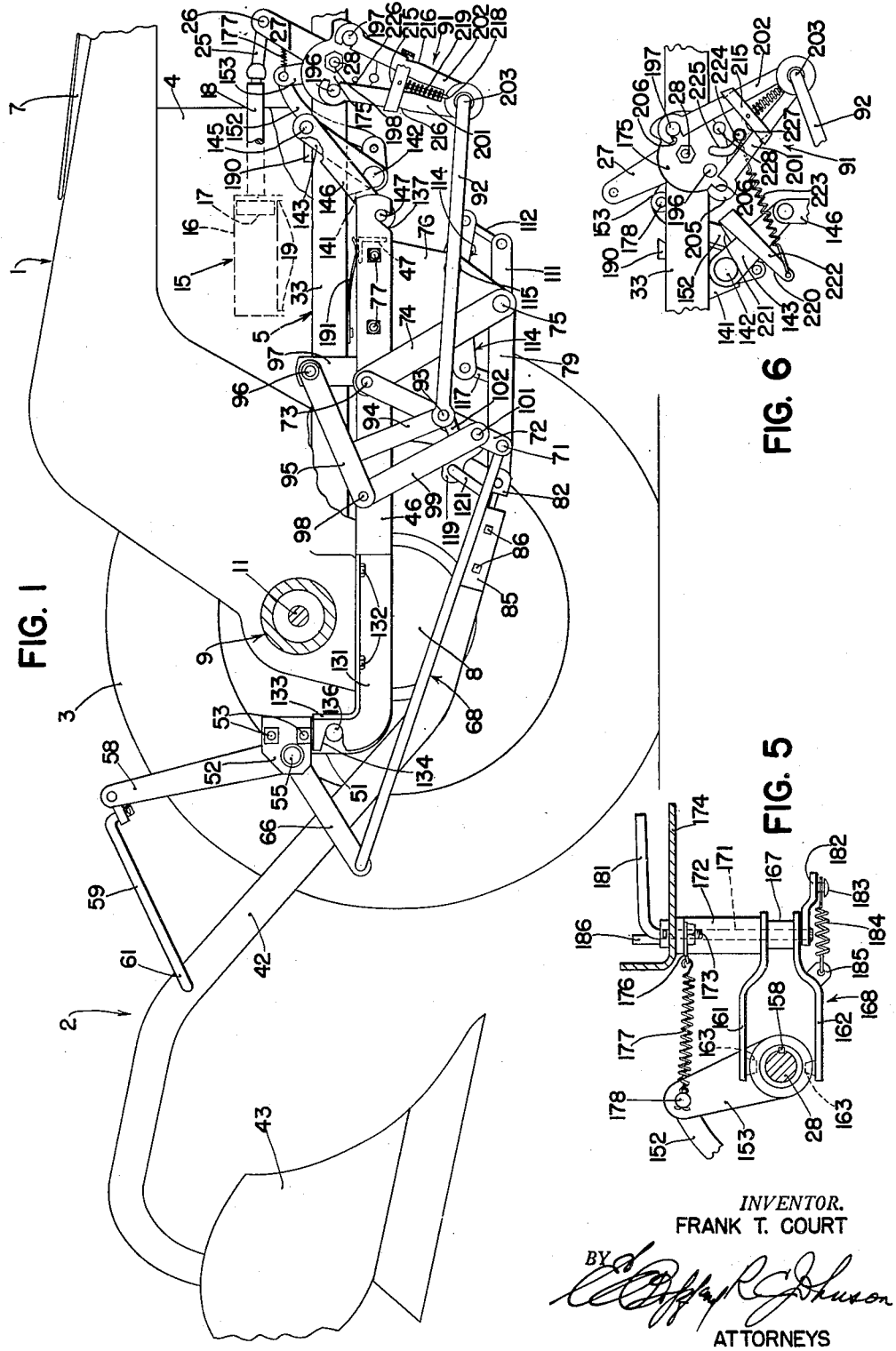
*INVENTOR.*
FRANK T. COURT
ATTORNEYS Nov. 27, 1951        F. T. COURT        2,576,779
IMPLEMENT ATTACHMENT MEANS
Filed Feb. 12, 1945        2 SHEETS—SHEET 2
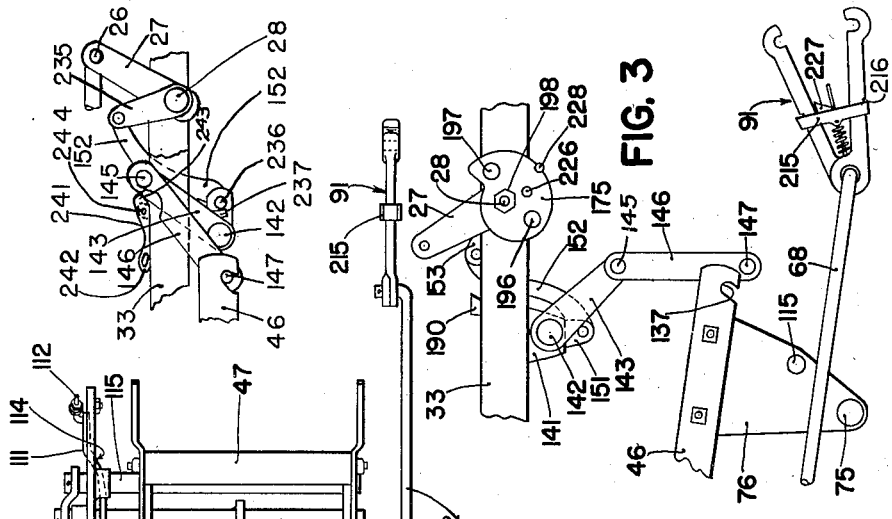
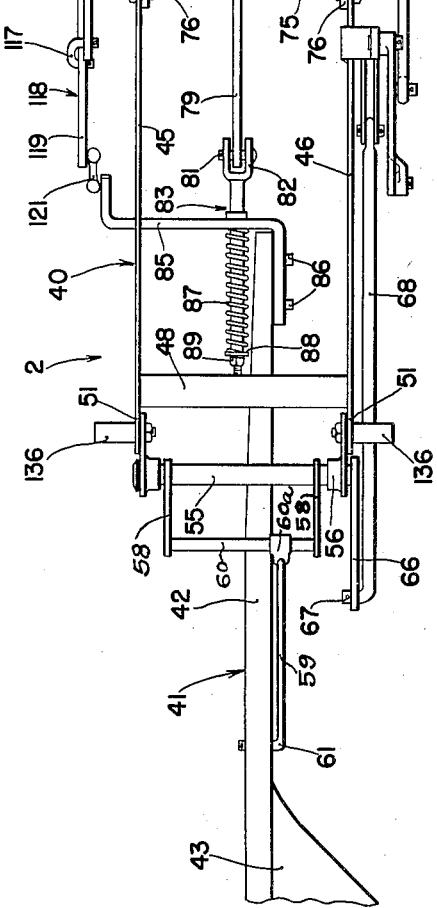
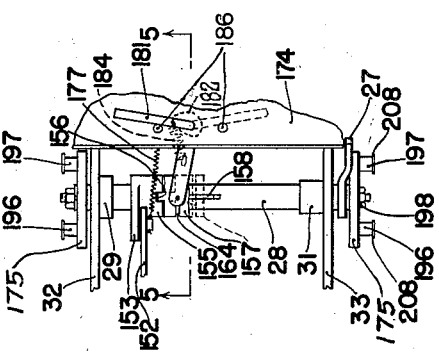
INVENTOR.
FRANK T. COURT
ATTORNEYS Patented Nov. 27, 1951

2,576,779

UNITED STATES PATENT OFFICE 2,576,779

IMPLEMENT ATTACHMENT MEANS

Frank T. Court, Moline, Ill., assignor to Deere & Company, Moline, Ill., a corporation of Illinois Application February 12, 1945, Serial No. 577,577

22 Claims. (Cl. 97—50)

The present invention relates generally to agricultural implements and more particularly to implements adapted to be mounted directly on a farm tractor. Implements of this general type are commonly referred to as integral implements or tractor mounted implements.

The object and general nature of the present invention is the provision of new and improved means for mounting implements of the integral type on the supporting and propelling tractor so as to facilitate attaching or detaching the implements. More particularly, it is a feature of this invention to provide new and improved mounting means whereby the connecting or disconnecting of the implement may readily be effected in a very short time. Further, it is a feature of this invention to provide means whereby the connecting and disconnecting of the implement may be effected by power, and still further, it is a feature of this invention to provide means whereby the tools of the implement may also be controlled by power derived from the tractor motor. It is an additional feature of this invention to provide means for utilizing the same power operating unit on the tractor for not only controlling the tools of the implement but also operating the implement attaching and detaching means.

Still another feature of the present invention is the provision of implement attaching and disconnecting means which may be actuated without requiring that the operator leave his seat on the tractor.

These and other objects and advantages of the present invention will be apparent to those skilled in the art after a consideration of the following detailed description, taken in conjunction with the accompanying drawings in which one preferred form of the present invention has been illustrated.

In the drawings:

Figure 1 is a side view of a tractor mounted plow in which the principles of the present invention have been incorporated.

Figure 2 is a plan view of the implement, showing the parts thereof in the positions they occupy when the implement is disconnected from the tractor.

Figure 3 is a fragmentary side view showing the relation between the front end of the implement and the adjacent portions of the tractor just after the implement has been detached from the tractor, or in the relative positions these parts occupy when the implement is ready to be attached to the tractor.

Figure 4 is a fragmentary plan view showing the clutch and associated parts which connect the power attaching means with the power lift mechanism of the tractor.

Figure 5 is a view taken generally along the line 5—5 of Figure 4.

Figure 6 is a fragmentary side view showing the details of the mechanism by which the implement-actuating power lift arm is automatically disconnected from the power lift rockshaft of the tractor when the implement is disconnected from the tractor.

Figure 7 is a modified view showing a hand operated mechanism for releasing the implement, in connection with power operated means for attaching the implement to the tractor.

Referring now to the drawings, particularly Figures 1 and 2, the reference numeral 1 indicates the tractor and the reference numeral 2 indicates the implement that may, according to the principles of the present invention, be readily disconnected from or connected to the tractor 1. The latter comprises more or less conventional structure, so far as the present invention is concerned, and embodies rear supporting wheels 3, a power plant 4 and a frame 5. Preferably, the tractor 1 has an operator's seat 7 disposed above and/or forwardly of the motor 4, and the rear traction wheels are connected to stub axles supported in a pair of drop housings 8 forming a part of a rear axle structure 9 in which power driven axle shafts 11 are mounted. The tractor 1 is also provided with a power lift apparatus, indicated in its entirety by the reference numeral 15. So far as the present invention is concerned, the power lift apparatus 15 may take any suitable form, preferably including a cylinder 16 in which a piston 17 is moved, the latter being connected to the inner end of a piston rod 18. The fluid is directed to one or the other of the ends of the cylinder 16 through connections 19. The flow of fluid to and from the cylinder 16 is controlled by any suitable valve mechanism, the actuation of which causes the piston 17 to be forced outwardly or inwardly, as desired, and held in any intermediate position of adjustment. Mechanism of this type is well known, so far as this invention is concerned, and for one form of hydraulic mechanism of this type reference may be had to my co-pending U. S. application, Serial No. 561,433, filed November 1, 1944, for Hydraulic Mechanism, now U. S. Patent 2,482,249, issued September 20, 1949. The outer end of the piston rod 18 is connected through a link 25 and associated ball and socket joints to a stud 26 carried at the upper or outer end of an arm 27 fixed in any suitable manner to a rockshaft 28 supported by bearings 29 and 31 carried by the side members 32 and 33 (Figure 4) forming portions of the tractor frame 5.

For purposes of illustration I have shown the implement 2 as being in the form of an integral single bottom plow, but it is to be understood that the present invention is not necessarily limited to a plow or, in fact, to earth-working tools. Referring now more particularly to Figure 2, the implement 2 includes an attaching frame 40 and an earth-working tool 41 in the form of a plow, including a plow beam 42 having a plow bottom 43 attached to the rear end thereof in a conventional manner. The implement attaching frame 40 is made up of a pair of longitudinally extending bars 45 and 46 suitably connected together at their ends by front and rear end bars 47 and 48. The rear ends of the frame bars 45 and 46 are turned upwardly, as at 51, and secured to each upturned end is a bracket 52, preferably fastened to the associated end 51 by bolts 53 or the like. The rear portion of each bracket is apertured to receive a transverse lifting shaft 55, each bracket formed with or carrying suitable bearing means 56 receiving the rockshaft 55. A pair of arms 58 are fixed at their inner ends to the ends of the rockshaft and at their other ends are apertured to receive a cross bar 60 carrying a slide block 60a to which is pivotally connected the forward or upper end of a link 59, the other end of which is pivotally connected in any suitable way, as by a swivel 61, to the beam 42. Whenever the rockshaft 55 is rocked in one direction or the other the rear end of the plow is raised or lowered.

A third arm 66 is fixed to the right end of the rockshaft 55 and is apertured to receive the inwardly turned end 67 of a link 68 which extends forwardly underneath the rear axle 9 of the tractor. The forward end of the link 68 is turned outwardly, as at 71, and inserted through an opening in the lower end of a swinging link member 72, the upper end of which is pivotally connected, as at 73, to the upper end of an arm 74, the lower end of the latter being fixed to a cross shaft 75 supported for rocking movement in a pair of brackets 76 fixed in depending relation, as by bolts 77, to the front ends of the implement frame bars 45 and 46. An arm 79 is fixed at its forward end to the intermediate portion (see Figure 2) of the cross shaft 75 and at its rear end is apertured to receive a pivot pin 81 by which the bifurcated head 82 of a draw bolt 83 is connected thereto. The draw bolt 83 extends rearwardly through a leveling bracket 85 fixed in any suitable manner, as by bolts 86, to the front end of the beam 42. A compression spring 87 is disposed about the rear end of the draw bolt 83, and the rear end of the spring 87 bears against a washer 88 held in position on the draw bolt 83 by a nut 89 or the like.

A power lift actuated arm indicated in its entirety by the reference numeral 91 is connected to the right end of the power lift rockshaft 28. The particular details of the arm 91, especially in connection with its quick detachability, will be referred to below. It suffices for the moment to not that the lower end of the arm 91 is pivotally connected with the forward end of a link member 92, the rear end of which is pivotally connected, as at 93, to an arm 94 forming a forwardly extending rigid part on a link 95. The latter is pivoted, as at 96, to a bracket 97 fixed to the right end implement frame bar 46. The other end of the link 95 is pivoted, as at 98, to the upper end of a link 99, the lower end of which is pivoted, as at 101, to the link 72 at/or adjacent to the pivot 71. The rigid arm 94 is formed with a stop extension 102 which, when the plow is lifted, bears against the lower end of the link 99, as shown in Figure 1. The left end of the transverse shaft 75 carries a forwardly extending arm 111 which is connected by an upwardly extending link 112 to the forward end of a lever 114 that is swingably mounted on a transverse supporting shaft 115 carried by the brackets 76. The rear end of the swingable lever 114 is connected by a link 117 to the intermediate portion of an arm 118 that is mounted at its inner end for swinging movement on the transverse shaft 75. The arm 118 includes an upwardly extended section 119 which at its rear end is pivotally connected by a link 121 to the other end of the leveling bracket 85. The linkage just described serves automatically to level the plow bottom 43 when the rockshaft 75 and associated parts is rocked to adjust the depth of operation of the plow. Linkage of this type is disclosed in more detail and claimed in my co-pending United States application, Serial No. 534,948, filed May 10, 1944.

The mechanism for quickly attaching and detaching the implement and which is operated by the tractor power lift will now be described. A pair of brackets 131 are rigidly connected, as by bolts 132, to the rear axle 9 of the tractor, and each bracket includes a rear upturned section 133 that is provided with a rearwardly facing notch 134 having rearwardly diverging or flaring edges, as best shown in Figure 1. A stud 136 is fixed to each rear upturned end 51 of the implement frame and is adapted to seat in the associated notch 134. The forward end of each of the implement frame bars 45 and 46 is provide with a downwardly facing notch or recess 137 arranged at a somewhat rearward angle, as best shown in Figure 3. The front portions of the tractor frame bars 32, 33 are provide with depending brackets 141 (Figure 1) in which a cross shaft 142 is rockingly mounted. An arm 143 is fixed rigidly to each end of the cross shaft 142 and at its outer end carries a pivot member 145 to which the upper end of a link 146 is connected. The lower end of each of the links 146 carries a stud 147. The studs 147 are adapted to enter the notches 137 in the front ends of the implement frame bars 45 and 46. An arm 151 is fixed to the generally central portion of the cross shaft 142 and is connected by a curved link 152 to an arm 153 which is swingably mounted on the cross shaft 28 (Figure 4) that is carried on the tractor. The arm 153 is provided with a hub section 155 having a notch 156 in which a lug on a clutch dog 157 is adapted to enter. The dog 157 is slidable on the shaft 28 but is held against rotation relative thereto by means of a key and slot arrangement, as indicated at 158 in Figures 4 and 5. When the clutch dog 157 is engaged with the hub 155 of the arm 153, the latter is locked to rotate or rock with the shaft 28. This is the position shown in Figure 4.

The clutch dog 157 is controlled by means of a pair of arms 161 and 162 which carry lugs 163 that ride in a groove 164 (Figure 4) formed on the clutch dog 157. The inner ends of the arms 161 and 162 are connected together by a sleeve section 167, being preferably welded thereto, and the arm assembly, indicated in its entirety by the reference numeral 168, is rockingly mounted on the lower end of a shaft 171 which is carried in a frame 172 that is bolted, as at 173, to the front platform 174 of the tractor. The frame 172 extends well below the platform 174 so as to bring the arm assembly 168 generally in the horizontal plane of the shaft 28. A clip 176 is secured by one of the bolts 173 and receives a balancing spring 177, the rear end of which is connected, as by a cotter, to the pivot 178 which connects the curved link 152 to the arm 153. The purpose of the spring 177, which is relatively light, is to balance the weight of the swinging arms 143 and associated parts when the clutch member 157 is disconnected from the arm 153, whereby the spring 177 normally holds the arms 143 and links 146 in an upper position. The shaft 171 at its upper end is bent to form a handle section 181, and at its lower end the shaft 171 carries an arm 182 to the outer end of which a pin or stud 183 is fixed. A relatively strong spring 184 is connected at its forward end to the stud 183 and at its rear end to a lug 185 fixed to the lower arm section 162, as best shown in Figure 5. The platform 174 carries a pair of stops 186 (see Figure 4) and the arm 182 extends forwardly so that by swinging the handle 181 against one or the other of its stops 186, the spring 184 acts as an over-center device resiliently urging the clutch dog 157 either into an engaged position with respect to the hub 155 or into a disengaged position. As shown in Figure 4, the spring 184 urges the clutch dog 157 into engagement with the hub 155. A pair of stops 190, preferably in the form of small blocks, welded or otherwise fixed to the tractor frame members 32 and 33, are disposed so as to limit the upward swinging of the arms 143 to the position shown in Figure 1. Secured to the lower edge of each of the tractor frame bars 32 and 33 is a leaf spring 191 arranged to form a resilient abutment by having the ends of the springs 191 engage the top flange of the implement across frame member 47, as best shown in Figure 1.

The quick detachable arm 91, mentioned in the first part of this description, is of particular construction and is especially adapted to be removed or attached quickly and easily and is also arranged to be detached merely by the proper operation of the frame disconnecting mechanism and the subsequent forward movement of the tractor relative to the implement. The quick detachable arm 91 will now be described. As best shown in Figure 4, the right end of the rockshaft 28 carries a plate 175 to which a pair of studs 196 and 197 are fixed, generally in diametrically apposed relation, as best shown in Figure 3. The plate 175 is secured to the right end of the cross shaft 28, which latter is preferably tapered, by any suitable means such as a nut 198. The arm member 91 consists of two arm sections 201 and 202, pivotally connected together at their lower end by any suitable means and apertured to receive the forward laterally inturned end 203 of the power lift link 92. Each of the arm sections 201 and 202 is formed with a head 205 having a laterally inwardly directed slot 206, the walls of which are spaced practically exactly the diameter of the studs 196 and 197. If desired, the latter may be formed with flanges forming a head, as indicated at 208 in Figure 4, to prevent the arm from slipping endwise off the studs 196 and 197.

A yoke 215, preferably in the form of an encircling strap member, is disposed about the middle portions of the arm sections 201 and 202, each of which middle portions is provided with a notch 216 (Figure 1). The yoke 215 is guided by a pin or rod 218 and is continually urged in an upward or inward direction, toward the head ends of the arm sections 201 and 202, by a compression spring 219. As best shown in Figure 6, the walls of the notches 206 are perpendicular to the longitudinal axes of the arm sections 201 and 202. The arm 91, which normally is permanently attached to the power lift link 92, is easily placed in position on the plate 175 by manually pressing the yoke 215 downwardly until the arms 201 and 202 can be spread apart sufficient to engage the ends of the yoke in the notches 216, this being the position of the arm member 91 shown in Figure 6. This provides sufficient clearance to engage one of the arms, such as the arm section 202, with the stud 197, whereupon the entire arm 91 can then be swung about the stud 197 as a center until the other notch 206 comes into a position opposite its stud 196. The arm sections 201 and 202 can then be moved toward one another manually, and as soon as the edges of the notches 216 clear the ends of the yoke 215, the spring 219 urges the latter along the arm sections 201 and 202 in wedging engagement, as shown in Figure 1, thus effectively holding the arm sections 201 and 202 in engaged relation with respect to the plate 175 and the studs 196 and 197 thereon. The arm 91 may be detached manually by manually pressing downwardly on the yoke 215 (Figure 1) until the ends enter the notches 216, whereupon the arm sections may then be spread apart, the engagement of the ends of the yoke 215 in the notches 216 preventing the expansion of the spring 219 so that the arm sections will be maintained in their spread or separated relation. The arm 91 may then be swung away from one of the studs and lifted from the other stud. Preferably, however, means is provided for automatically disconnecting the arm 91 but this means will be described later.

The operation of the implement as so far described is substantially as follows.

Figure 1 shows the parts in the positions they occupy when the plow and its frame are locked to the tractor and the plow raised into a transport position, facilitating travel of the outfit along roads and highways or from one field to another. By proper actuation of the power lift apparatus, which includes the ram unit 15, the arm 91 may be swung fore and aft to raise and lower the plow bottom 43 and also adjust the operating position thereof through the linkage which includes the parts 74, 75, 79, 72, 92, 95, and 99, together with the link 68, the two arms 58 and 66, which form a bell crank, and the associated link 59. When the plow is in operating position and it is desired to raise and lower the same or to adjust its depth by rocking the arm 91 in a fore and aft direction by rocking the rockshaft 28, the clutch dog 157 (Figure 4) is in the position shown in dotted lines disengaged from the arm 153 so that the latter is not affected by the rocking of the cross shaft 28.

When it is desired to remove the implement from the tractor, as after a plowing operation, the plow 43 and associated parts are raised into their transport positions and the tractor driven to the point where it is desired to leave the implement, the transport position of the implement being shown in Figure 1. The handle 181 (Figure 4) is first swung from the dotted line position into the full line position, which causes the clutch dog 157 to engage the hub 155 of the arm 153 so that rocking movement of the rockshaft 28 will also rock the arm 153. First, however, it is to be noted that when the implement is attached to the tractor not only are the studs 136 held in the notches 134 at the rear of the tractor but, in addition, the front ends of the frame members 45 and 46 are held up in position against the tractor, with the abutment springs 191 bearing against the cross angle 47, by the engagement of the studs 147 in the notches 137 and the arms 143 occupying an over-center position and lying against the stops 190. This over-center position is best shown in Figure 1 in which it will be seen that the axis defined by the cross shaft 142 lies to the right of a line connecting the studs 147 and the pivot 145. It will also be noted that the action of the abutment springs 191, which may be relatively heavy, is to actively hold the arms 143 against the associated stops 190.

Now when it is desired to disconnect the implement, as mentioned above, the first step is to swing the handle 181 from its dotted line position over into its full line position (Figure 4). This causes the spring 184 to swing the arm assembly 168 toward the left, bringing the clutch member 157 over into a position engaging the hub 155 and locking the arm 153 to the rockshaft 28. The clutch members and associated parts are so arranged that when the power lift apparatus on the tractor is in its extended position the corresponding position of the rockshaft 28 is such that the lug on the shiftable clutch member moves directly into the notch 156.

After the clutch dog 157 has been engaged with the hub 155 of arm 153, the power lift apparatus 15 is actuated to lower the plow 43 to the ground by a forward movement of the arm 91. This not only lowers the plow bottom but, since the arm 153 is locked to the rockshaft 28, the arms 143 are swung downwardly, carrying the links 146 downwardly past their dead center relationship with respect to the pivot shaft 142 and substantially into the position shown in Figure 3 in which the front brackets 76 rest on the ground and the links 146 are free to swing away from the implement frame. During the movement of the front end of the frame 40 to the ground, as just mentioned, the studs 136 remain in the slots or notches 134. However, when the front end of the frame 40 drops to the ground the associated linkage and other parts at the front end of the plow are also carried down into engagement with the ground so that, after disconnecting the arm 91 from the studs 196 and 197 and driving the tractor forwardly, the rear end of the frame, including the studs 136, does not settle downwardly appreciably, but instead they remain in a position in which the tractor may be readily backed thereinto, when reconnecting the implement. In reconnecting the implement, it is not necessary to back the tractor until the studs seat in the bottom of the frame notches 134; all that is necessary is that the tractor be backed into a position in which the studs 136 lie in or closely adjacent the mouth or entrance opening of the notches 134. Reconnecting the implement with the tractor is described in detail below. Thus, the power lift apparatus is easily and conveniently operated to disconnect the implement from the tractor. As described above, the arm 91 may be disconnected manually by pressing down on the yoke 215 to permit the arm sections 201 and 202 to be spread apart so they can be removed from the studs 196 and 197. As illustrated in Figure 3, the arm 91, thus removed from the studs 196 and 197 remains with the implement as a part thereof. Usually it is preferable to swing the links 146 upwardly into a position so that they do not strike objects on the ground in the further operation of the tractor, and to do this it is merely necessary either to operate the power lift to swing the arms 143 forwardly substantially into the position shown in Figure 1, or to release the clutch dog 157 by swinging the handle 181 over into its dotted line position, whereupon the balancing spring 177 will either raise the links 146 or hold them in their raised position if they are lifted manually. After the arm 91 has been disconnected the tractor may then be driven directly away from the implement, the studs 136 slipping out of the notches 134 in the tractor frame brackets 131.

It will be seen from Figure 4 that the left end of the shaft 28 is also provided with a plate 175 carrying studs 196 and 197 so that, in the event some implement is attached to the tractor that requires two lifting and/or operating arms, two arms 91 may be provided and connected and disconnected from the rockshaft 28 in the manner just described.

In disconnecting the arm or arms 91, as described above, they are removed manually. According to the principles of the present invention, however, I prefer to provide means for automatically disconnecting each arm 91 by the action of disconnecting the implement frame. Referring now to Figure 6, it will be seen that I have provided a U-shaped bracket 220 having its short section 221 welded or otherwise secured to the upper edge of the associated arm 143. The longer section 222 of the bracket 220 is apertured to receive the rear end of a tension spring 223. The forward end of the spring 223 is connected to a transverse lug 224 carried on a swinging pawl 225, the latter being swingably mounted in an opening 226 (Figure 3) in the plate 175. The lug 224 is arranged to operate against a cam member 227 which is mounted on the yoke 215 in such a position that, as shown in Figure 6, when the arm 143 is swung from the position shown in Figure 1 down to the position shown in Figure 6, the spring 223 is tensioned and pulls the lug 224 with sufficient force against the cam 227 to force the yoke 215 down into a position where the notches 216 engage the ends of the yoke 215. In acting in this manner, a portion of the pawl 225 rides against the arm section 201, forcing the upper end away from the stud 196, as shown in Figure 6. Then when the tractor is driven away from the implement the stud 228 on the plate 175 serves as a fulcrum against which the arm section 202 is pulled, since the implement remains on the ground while the tractor is driven forwardly. The forward movement of the tractor then rocks the arm 202 out of engagement with the stud 197 and the arm 91 then falls to the ground entirely disconnected from the tractor. It will be seen that this disconnection of the arm 91 is effected automatically and without any additional attention on the part of the operator.

The implement is attached to the tractor in about as short a length of time as is required for its disconnection. With the implement on the ground, the tractor is backed into a position so that the notches 134 are in front of the studs 136 on the implement frame, whereby the studs 136 are in a position at the mouth or entrance of the notches 134 and thereby in a position to be drawn into the bottoms of the notches 134 when the implement frame is locked to the tractor. Backing the tractor into the position just mentioned brings the rockshaft 28 and associated parts substantially over the front end of the frame, in the position shown in Figure 3. The clutch 157 is then engaged with the hub 155 of the arm 153 if for any reason it has been disengaged, and next the power lift 15 is actuated to swing the arm 27 rearwardly. This also swings the arm 153 rearwardly and lowers the arms 143 and links 146. Next the handle 181 is swung over into its dotted line position to disengage the clutch so as to permit an independent movement of the arms 143, which is permitted by virtue of a small amount of lost motion between the clutch dog 157 and its notch 156 in the hub 155. The operator then dismounts from the tractor and manually swings the links 146 rearwardly a distance sufficient to bring the studs 147 under the notches 137. Then the links 146 are raised manually to seat the studs 147 in the notches 137, this causing a slight rotation of the arms 143 and the rockshaft 142. The balancing spring 177 exerts sufficient force to hold the links 146 and the studs 147 thereon engaged with the notches 137 in the frame of the implement. Next the operator swings the control handle 181 from its dotted line position (Figure 4) over into its full line position and then operates the power lift apparatus 15 to rock the arm 153 forwardly. This swings the arms 143 in a counterclockwise direction (Figure 3) and thus exerts immediately a lifting effort on the front end of the frame, which is also pulled forward a slight distance sufficient to cause the studs 136 to enter the associated notches 134, since in swinging upwardly from the position shown in Figure 3, the arms 143 act through the links 146 not only to lift the front end of the implement frame but also to move the same forwardly a slight amount relative to the tractor. As the arms 143 are continued to be swung in a counterclockwise direction, they eventually pull the front end of the implement frame up against the springs 191 and swing the links 146 into an over-center position with respect to the shaft 142, the arms 143 coming to rest against the stops 190 at the same time that the power lift apparatus reaches its fully extended position (Figure 1). The arms and links 143 and 146 therefore act, in conjunction with the abutment members or springs 191, as an over-center lock effectively holding the front end of the implement frame up against the tractor frame and, in addition, holding the rear end of the implement frame fully engaged in the notches 134 on the tractor-carried brackets 131. All that now remains to be done is to manually connect the arms 201, 202 with the studs 196 or 197 and lastly to swing the handle 181 from its full line position over into its dotted line position so as to release the arm 153 from its clutch connection with the power lift shaft 28, thus freeing the implement connecting apparatus, with the implement locked to the tractor, from its connection with the power lift apparatus of the tractor and thus releasing the latter for actuation to raise and lower and/or adjust the implement tool 43.

Figure 7 shows an arrangement which may be used where it is desired to eliminate the clutch 157 and associated parts. As shown in Figure 7, instead of having the arm 153 loose on the shaft 28 and connected thereto by the clutch 157, I now provide an arm 235 arranged to take the place of arm 153 but fixed rigidly to the cross shaft 28. The arm 235 is connected through the link 152 to an arm 236 which is loose on the shaft 142. The arm 236 carries a lug 237 which is in a position to engage the forward edge of the arm 143, thereby forming a one way connection therewith. The other parts shown in Figure 7 are described above except that, instead of the fixed stop 190, I provide a hand operated cam member 241 having a handle portion 242 and an eccentric section 243 pivotally mounted, as at 244, on a bracket mounted on the tractor frame bar 33 in the proper position to serve, in the position shown in Figure 7, as a stop for the arm 143 in exactly the same way as the stop 190 described above.

In operation the form of the invention shown in Figure 7 acts as described above so far as attaching the implement to the tractor by power is concerned. It will be clear from Figure 7, when the power lift is actuated to swing the rockshaft 28 in a clockwise direction, a pull is exerted by the arm 235 that is fixed to the shaft 28 on the link 152, and the link 152 exerts a rocking action on the loose arm 236 which has the stop 237 thereon. The stop 237 therefore acts to swing the arm 143 up into the position in Figure 7, which corresponds to the same position of the arm 143 shown in Figure 1, the points 145 and 147 passing beyond an overcenter position so as to lock the plow frame to the tractor. When it is desired to disconnect the plow frame, all that it is necessary to do is to grasp the handle 242 and lift upwardly and forwardly thereon. This causes the cam or eccentric portion 243 to pass against the rear edge of the arm 143, by swinging the same out of its overcenter position and into a position in which the arms 143 are free to swing downwardly into a position coresponding to that shown in Figure 3.

While I have shown and described above, the prefered structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. The combination with a tractor having a source of power, a swingable part mounted on the tractor for movement upwardly and forwardly relative thereto and downwardly and rearwardly relative thereto, and means for operating said part from said source of power, of an implement adapted to be attached to the tractor, interengaging parts on the rear portion of the tractor and the implement adapted, when engaged, to cause the implement to be supported on the tractor, and a part on the forward portion of the implement for receiving said swingable part whereby operation of the latter by said power lift in an upward and forward direction serves to bring said interengaging parts into engagement and thereby to attach said implement to said tractor.

2. In an agricultural machine, including a tractor having a power operated part and an implement having a part to be adjusted, a quick detachable arm comprising a pair of relatively movable members pivotally connected together, means serving as a pair of studs on said power operated part, means on said members to receive said studs, and releasable means for holding said members engaged with said studs.

3. In an agricultural machine, a power operated part having a pair of studs, and an implement adjusting arm comprising a pair of members pivotally connected together at their outer ends and having at their inner ends a pair of slotted heads, the slots being adapted to engage said studs, and detachable means for holding said members engaged with said studs.

4. The combination with an implement having tool means adapted to be raised and lowered, said implement being adapted to be mounted on a tractor having a power lift device and including a rockshaft operated thereby, of interengageable parts for connecting said rockshaft with said tool means, whereby operation of said rockshaft serves to shift said tool means, an auxiliary device adapted to be operated optionally from said rockshaft, and clutch means on the latter adapted optionally to connect said auxiliary device with said rockshaft to be operated with the latter from said power lift device.

5. The invention set forth in claim 4, further characterized by said clutch including parts adapted to interengage in certain relative angular positions, one of said parts being connected with said rockshaft, and means for shifting said clutch including a spring biased member adapted to move the other of said clutch parts into engagement with the other, said member being movable into clutch engaging position before said clutch parts are in an angular position accommodating engagement, the force of said spring bias serving to cause said clutch parts to engage when said rockshaft has been moved into the proper position for engagement.

6. In an agricultural machine, a tractor having power control mechanism, an implement adapted to be connected to the tractor and having tool means adapted to be adjusted, means connected with said power control mechanism for adjusting said tool means, toggle mechanism for connecting said implement to the tractor, a part connected with the power control mechanism and having a one-way connection with said toggle mechanism for operating the latter to raise the implement when the power control mechanism is operated in one direction, and a shiftable member on the tractor positioned to act against said toggle mechanism when the latter is disconnected from said power control mechanism for releasing the implement from the tractor by moving said toggle mechanism past its overcenter locking position.

7. An implement adapted to be mounted on a tractor having a power operated part movably mounted on the tractor forward of the rear end thereof, and implement-receiving means disposed generally at the rear of the tractor, said implement comprising frame means, a part on the rear of the frame means adapted to engage said implement-receiving means on the rear portion of the tractor when the implement frame means is shifted in one direction relative to the tractor, and a part on the forward portion of the implement to receive said power operated part whereby movement of the latter in said direction connects the rear portion of said frame means with the implement-receiving means at the rear of the tractor, said tractor power operated part being movable in a direction to shift the forward portion of said implement frame means into a position connecting the frame means to the tractor, thereby connecting the implement frame means to the tractor by the operation of the tractor power unit.

8. An implement adapted to be connected to a tractor having a power operated unit, a generally rearwardly facing implement-receiving socket, and an implement shifting means including an upwardly and forwardly movable part connected with said power operated unit, said implement comprising frame means, a part carried by the rear portion of said implement frame means and adapted to seat in said socket, and means on the forward portion of said frame means to receive said upwardly and forwardly movable part whereby the latter is adapted to engage the forward portion of said frame means and draw the same upwardly into supporting relation with respect to the tractor and engage said rear implement carried part in said rearwardly facing socket on the tractor.

9. An agricultural machine including a tractor having a power operated part and an implement adapted to be mounted on a tractor, said implement comprising frame means adapted to be carried by the tractor, bracket means adapted to be fixed to the tractor, means on the implement frame means interengaging with said bracket means for holding the rear portion of said frame means on the tractor, a shiftable part mounted on said tractor and including a portion engageable with the front end of said implement frame means for holding the latter in position on the tractor and also holding said implement frame means engaged with said bracket means, and means operated by said power unit for actuating said part.

10. In an agricultural implement, a mobile support, an operating member carried thereby, a part adapted to be attached to said support, a pair of pivotally interconnected links, one being adapted to be connected with said part and the other swingably mounted on said support, stop means associated with one of said links to define an over-center position for holding said part connected to said mobile support, and means releasably connecting said swingably mounted link with said operating member whereby movement of the latter may be utilized for swinging said swingable link into said overcenter position and the swingable member released from said operating member to free the latter for other services.

11. An agricultural implement, a mobile support having a power operated unit, bracket means attachable to the rear of said mobile support and having generally rearwardly facing sockets, abutment means on the rear of the implement engageable in said sockets by a rearward movement of said mobile support relative to the implement, a swingable part mounted on said mobile support forward of said brackets and engageable with the forward end of the implement for exerting a forward and upward pull thereon relative to said mobile support, whereby said implement is held in engagement with said rearwardly facing sockets, and means operatively connecting said power unit with said swingable member.

12. An implement adapted to be mounted on a tractor having a rearwardly facing socket at its rear end and an implement-engaging part at its forward end swingable relative to the tractor in a generally upward and forward direction, said implement comprising frame means, a part carried at the rear of said frame means and adapted to seat in said socket when the implement frame is moved forwardly relative to the tractor, and socket means on the forward end of said frame and adapted to be engaged by said implement-engaging part of the tractor whereby upward and forward movement of the latter serves to draw said frame forwardly and upwardly relative to the tractor and cause said implement part to seat in said socket.

13. An implement adapted to be mounted on a tractor having a rearwardly facing socket at its rear end, a power operated arm swingably mounted on the tractor and a link pivotally connected with said arm, said implement comprising frame means, a part carried at the rear of said frame means and adapted to seat in said socket when the implement frame is moved forwardly relative to the tractor, socket means on the forward end of said frame and adapted to be engaged by said link at its lower end, swinging movement of said arm acting through said link to pull said implement frame upwardly and forwardly relative to the tractor and forward movement of said frame relative to said tractor causing said implement part to engage in said socket on the rear of the tractor, said arm and link moving into an over center position for locking the front end of said implement frame to the tractor.

14. The combination with a tractor having a rearwardly facing socket at its rear end, a power operated arm swingably mounted on the tractor and a link pivotally connected with said arm, of an implement adapted to be connected with said tractor and comprising frame means, a part carried at the rear of said frame means and adapted to seat in said socket when the implement frame is moved forwardly relative to the tractor, socket means on the forward end of said frame and adapted to be engaged by said link at its lower end, swinging movement of said arm acting through said link to pull said implement frame upwardly and forwardly relative to the tractor and forward movement of said frame relative to said tractor causing said implement part to engage in said socket on the rear of the tractor, said arm and link moving into an over center position for locking the front end of said implement frame to the tractor.

15. The combination with a tractor having a pair of brackets fixed thereto each bracket having a rearwardly facing socket at its rear end, a pair of power actuated arms swingable on the tractor, a link pivoted at one end to each of said arms, the other end of each link having a stud, of an implement adapted to be connected with said tractor and comprising frame means, a transverse bar carried by the rear portion of said frame means and adapted to be received in said bracket sockets when the implement frame is moved forwardly relative to the tractor, a pair of sockets on the front end of said implement frame means and adapted to receive the studs on the ends of said links, swinging movement of said arms acting through said links and studs to shift said implement frame means upwardly and forwardly relative to the tractor so as to cause said transverse bar to seat in the bracket sockets, said arms and links moving into an overcenter position for locking the front end of said implement frame to the tractor.

16. In a tractor adapted to have an implement frame connected therewith, a mobile support, an arm swingably mounted thereon, an abutment on said support adapted to be engaged by said implement frame in one position of the latter relative to the tractor, a link pivotally connected at one end to the outer end of said arm, implement-engaging means on the other end of said link, said link and arm being brought into an over center position when said implement-engaging means engages said implement frame and movement of said arm acts through said link to move said implement into engagement with said abutment, said abutment means being resilient to accommodate movement of said arm and link into said over center position.

17. A tractor adapted to support an agricultural implement or the like, comprising a mobile power operated support, a power operated unit mounted thereon, an implement-adjusting member mounted on said tractor, means for operatively connecting said implement-adjusting member with said power operated unit, an implement-attaching means movably mounted on said tractor, and a clutch for optionally connecting said power operated unit with said implement-attaching means for actuating the latter from said power operated unit.

18. A tractor adapted to support an agricultural implement or the like, comprising a mobile power operated support, a power operated unit mounted on said support, an implement-attaching means movably mounted on the tractor including parts movable into an overcenter position for locking the implement to the tractor, and means for actuating said implement-attaching means from said power operated unit on the tractor, including a shiftable clutch disposed between said parts and said power operated unit for disconnecting the latter therefrom after said implement has been attached to the tractor.

19. An agricultural machine adapted to be mounted on a tractor having a power operated part, said machine including an implement frame adapted to be detached from and connected to said tractor and including tool means adapted to be adjusted relative to said implement frame, means for connecting said power operated part with said implement tool means to operate the latter, said means including an arm having a detachable connection with said power operated part, means operated by said power operated part for disconnecting said implement frame from the tractor, said means including a member movable relative to said arm into a given position with respect thereto when the implement frame is disconnected from the tractor, and means responsive to movement of said member into said given position, in detaching said implement frame from the tractor, for disconnecting said detachable arm from said power operated part on the tractor.

20. An agricultural machine adapted to be mounted on a mobile support having a power operated rockshaft carried thereby, said agricultural machine including frame means, ground-working tool means movable relative to said frame means, an implement-adjusting arm, means for detachably connecting said arm with said rockshaft, an implement-engaging and attaching means adapted to be carried by said support, shiftable clutch means for optionally connecting said implement-engaging and attaching means with said power operated rockshaft to be operated by movement of the latter, a member carried by said implement-engaging and attaching means and movable in a given direction relative to said arm when said implement-engaging and attaching means is moved in a direction accommodating disconnection of the implement frame from said mobile support, and means operated by movement of said member for disconnecting the detachable arm from the rockshaft.

21. The combination with a tractor adapted to support an agricultural implement or the like and comprising a mobile power operated support, a power operated unit mounted thereon, an implement-adjusting arm rockably mounted on said support, means for connecting said arm with said power operated unit to be operated thereby, an implement-attaching means movably mounted on said support, and means for actuating said implement-attaching means from said power operated unit, including a shiftable clutch adapted to be engaged with and disengaged from said implement-adjusting arm, of an implement adapted to be attached to said tractor and including a frame and removable tool adjustable relative to said frame, said frame having means engageable by said implement-attaching means whereby the latter connects the frame rigidly to the tractor, means connecting said adjustable tool and said implement-adjusting arm on the tractor, and means for detachably connecting said arm with said power operated unit.

22. An agricultural implement adapted to be attached to a tractor having a power unit and a rockable member operated thereby, said implement comprising a frame, tool means movable relative to said frame, interengaging parts, one on the rear portion of the implement frame and one adapted to be mounted on the rear portion of the tractor for receiving the part on the rear portion of said implement frame, linkage means releasably connectible with said rockable member on the tractor and with the forward end of said frame for holding the latter in supported relation on the tractor, a lock for locking the implement frame to the tractor when said linkage means is released from said rockable member, and means also connecting said rockable member with said implement tool means for raising and lowering said implement tool means relative to said implement frame when said frame is connected with the tractor.

FRANK T. COURT.

REFERENCES CITED

The following references are of record in the file of this patent:

UNITED STATES PATENTS

| Number | Name | Date |
|---|---|---|
| 1,906,430 | Strehlow | May 2, 1933 |
| 2,125,593 | Starr | Aug. 2, 1938 |
| 2,247,367 | Frudden et al. | July 1, 1941 |
| 2,292,961 | Mott | Aug. 11, 1942 |
| 2,319,492 | Dewey | May 18, 1943 |
| 2,320,168 | Benjamin et al. | May 25, 1943 |
| 2,332,720 | Hipple | Oct. 26, 1943 |
| 2,341,802 | Morkoski | Feb. 15, 1944 |
| 2,354,250 | Evans | July 25, 1944 |
| 2,361,362 | Altgelt | Oct. 31, 1944 |
| 2,368,312 | Luger | Jan. 30, 1945 |
| 2,407,006 | Harris | Sept. 3, 1946 |